United States Patent [19]

Milbrett

[11] Patent Number: 4,833,306

[45] Date of Patent: May 23, 1989

[54] BAR CODE REMOTE RECOGNITION SYSTEM FOR PROCESS CARRIERS OF WAFER DISKS

[75] Inventor: Lynn Milbrett, Young America, Minn.

[73] Assignee: Fluoroware, Inc., Chaska, Mich.

[21] Appl. No.: 196,132

[22] Filed: May 18, 1988

[51] Int. Cl.$^4$ .............................................. G06F 15/20
[52] U.S. Cl. ...................................... 235/375; 235/462
[58] Field of Search ................................ 235/375, 462

[56] References Cited

U.S. PATENT DOCUMENTS 4,625,101  11/1986  Hinks ................................... 235/462

*Primary Examiner*—Harold T. Pitts
*Attorney, Agent, or Firm*—Faegre & Benson

[57] ABSTRACT

A remote recognition system for monitoring the progress of a plurality of batches of semiconductor wafers or memory disks through a series of processing operations based on bar code recognition technology. Each batch is placed in a carrier in which it is transported to various locations where processing operations are performed. Each carrier is provided with an optically visible bar code tag, coded to be responsive to within reading range of a bar code reader unit which transmits a modulated light beam signal to the coded bar code tag and reads and decodes the light beam reflected back and collected by an optical receiver to uniquely identify the carrier that is positioned within range of the reader unit. Information from the reader units to permit monitoring the progress of semiconductor wafer or memory disk batches through multiple processing operations is received by further control apparatus. The novel bar coded carrier for use with this remote recognition system uses a bar code tag encapsulated in an external wall of the carrier, so that the bar code tag is protected from harsh chemical environments encountered by the process carrier while it remains readable by the various bar code reader units.

11 Claims, 3 Drawing Sheets

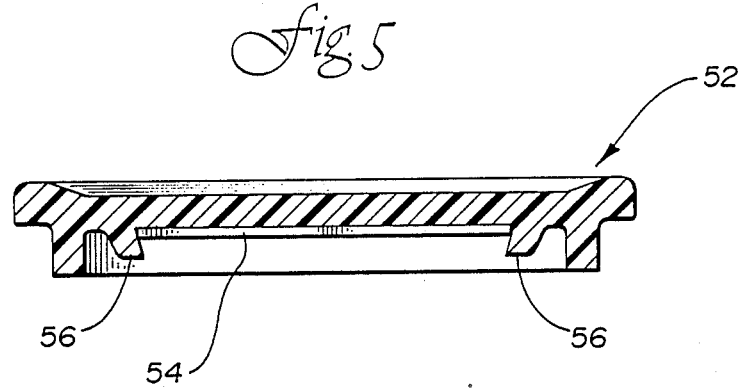
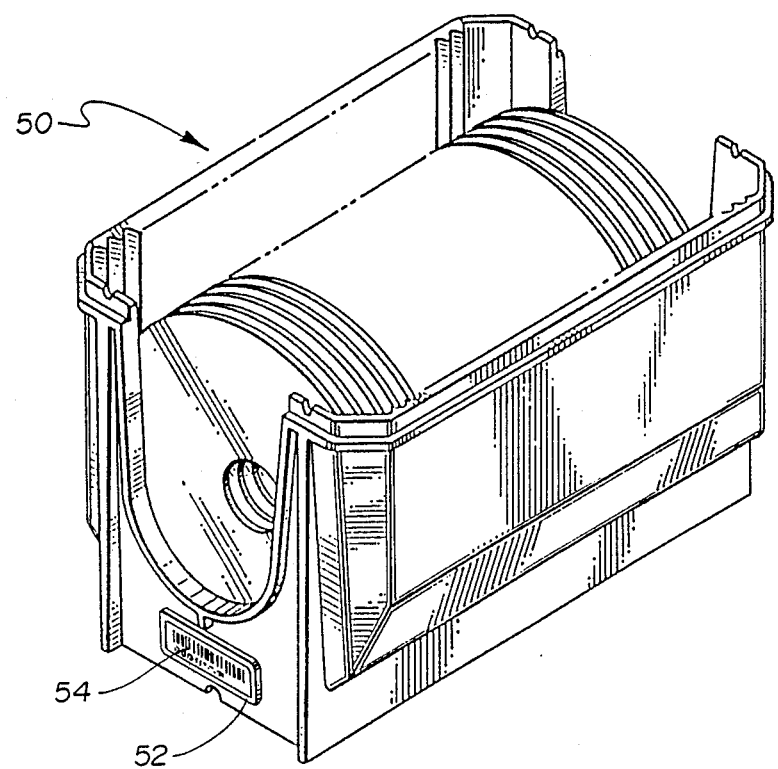

BAR CODE REMOTE RECOGNITION SYSTEM FOR PROCESS CARRIERS OF WAFER DISKS

BACKGROUND OF THE INVENTION

1. Field of the Invention

This invention relates to a system for identification, tracking and monitoring of the progress of process carriers containing batches of semiconductor wafers or memory disks through a variety of different processing operations at various locations within a plant facility and between different plant facilities using a bar code remote recognition system.

2. Description of the Prior Art

The semiconductor manufacturing industry requires that process carriers containing semiconductor wafers be moved through a manufacturing plant to a number of different locations where the semiconductor wafers are subjected to a variety of processing operations. Such operations include etching, cleaning, processing using photolithography operations, and subjecting to various other manufacturing, testing and processing operations. The manufacturing of memory disks similarly involves processing through a sequence of manufacturing operations within a manufacturing facility and between different facilities. In this industry, the wafers or memory disks are commonly handled in batches contained within carriers which are specifically designed to support the wafers or memory disks in the proper position for the manufacturing and processing machinery to either handle the disks or wafers while they remain in the carriers or alternatively remove them for a processing operation and then return them to the carrier. A batch, as defined and used hereinafter, means one or more (up to the capacity of the carrier) of the semiconductor wafers or memory disks.

As a process carrier containing a batch of wafers or memory disks moves throughout the manufacturing plant, it is desirable to track its progress through the manufacturing and processing operations. This has conventionally been done on a manual basis, either by generating paper records to track the progress of process carriers containing particular batches through these various operations or by some semi-automated system such as manual keyboard entry. A method and apparatus for monitoring the location of process carriers containing wafer disks has been disclosed in commonly assigned co-pending U.S. patent application Ser. No. 07/061,935, filed June 11, 1987, which involves the use of RF interrogation of coded surface acoustic wave transponder structures associated with the carriers for wafers or memory disks. However, it is desirable to provide a method for monitoring the location of disks and the carriers containing them which is reliable, involves low capitol investment, functions cooperatively with monitoring and tracking systems utilized in other fabrication areas within the industry, allows for rapid, reliable, non-contact monitoring and is impervious to attack by the various chemicals used in the processing of wafer disks. The present invention thus provides a location monitoring system which meets these requirements.

Methods of identifying, tracking and inventorying using coded bar code indicia have been in existence for about the past 15 years. Bar code indicia conventionally consist of a number of spaced apart parallel lines of varying widths. Data is coded in the width and spacing of the lines, so that when an optical probe is scanned across the code in a direction normal to the lines, a light beam in the probe is modulated in a manner which is unique to the particular code. The modulated light beam is directed and detected by an electro-optical detector and thereafter the resulting signal is processed and stored in an electronic computer.

Despite the length of time that bar code identification has been available, the application of bar code identifying, tracking and inventorying techniques to monitoring the location and progress of process carriers containing semiconductor wafers or memory disks through processing and manufacturing operations has not heretofore occurred. The application of bar coded systems to wafer or disk process carriers has not been implemented because of the harsh chemical and temperature processing environments to which these carriers are subjected under normal use conditions, which conditions would be destructive to most currently available bar code tags. Most currently available bar code tags are adhered to the substrate surface by adhesives. These tags and/or their adhesives would be readily deteriorated by the action of harsh chemicals. Also, although newer adhesives have reasonably good adherence to the surface of the process carriers, typically formed of TEFLON, even these newer adhesives are soon deteriorated by the chemicals used in processing. An acceptable bar code tag for process carriers must not be affected by chemical attack during the useful life of the carrier and must not contaminate or contribute to contamination of the chemical process baths.

This invention presents an encapsulation system for attaching a bar code tag to a process carrier, so that the tag is protected from the harsh chemical environment to which the carrier is to be subjected, while at the same time allowing the bar code indicia to be readily and accurately readable by conventionally available bar code scanners, preferably laser scanners.

BRIEF DESCRIPTION OF THE INVENTION

The present invention provides a method for monitoring the location and progress of a plurality of process carriers containing batches of semiconductor wafers or memory disks through a multiplicity of processing operations. The method includes inserting each of the batches of wafers or memory disks into a carrier constructed and arranged for supporting the wafers or disks in parallel, axially arranged spaced arrays. The carrier is adapted to permit the carrying out of processing operations at various locations within the plant without removal of the batch of semiconductor wafers and memory disks from the carrier. Each carrier is provided with a coded bar code indicia tag, attached to the carrier in such a way as to effect optimum protection of the tag from the harsh chemical environments to which the process carrier is to be subjected. The bar code tag is coded to uniquely identify the carrier and the associated batch of wafers or disks contained therein. The proximity of each carrier to various locations within the processing facility is detected by a multiplicity of bar code indicia reader units, each of which is positioned at one of various locations and is constructed and arranged for determining the unique identification of any carrier within its detection range by means of the uniquely coded bar code indicia tag attached to a particular carrier. The progress of process carriers containing batches through processing operations is monitored by storing and updating carrier identification information from the bar code indicia reader units.

BRIEF DESCRIPTION OF THE DRAWINGS

FIG. 5, is a profile of a cover for retaining a bar code tag for encapsulation onto a surface of carrier according to an alternative embodiment of this invention; and FIG. 6 is a pictorial of a process carrier with an encapsulated bar code on its surface using the cover of FIG. 5.

DETAILED DESCRIPTION OF THE PREFERRED EMBODIMENT

Figure 1:
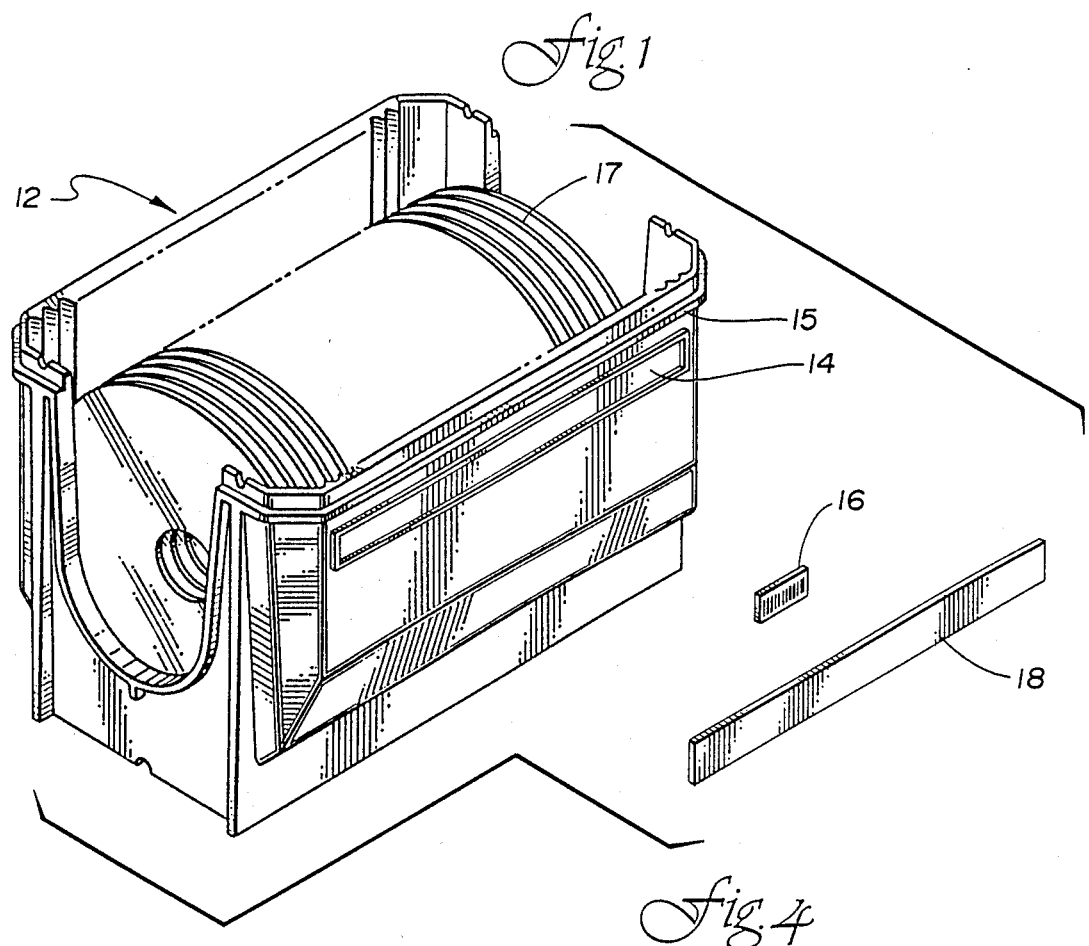
FIG. 1, is a partially exploded pictorial drawing of a typical carrier.

In FIG. 1, a typical wafer or disk carrier suitable for transporting and supporting a plurality of semiconductor wafers or memory disks 17 in a parallel axially arranged and spaced array is identified generally with reference character 12. The term "disk" hereinafter is used to designate either a semiconductor wafer or a computer memory disk, since the technology described here may suitably be used for either type of product as well as any other generally similar product having a thickness which is substantially less than the width. Such carriers are currently commercially available from Fluoroware, Inc., 102 Jonathan Boulevard North, Chaska, Minn. 55318 and are in wide spread use generally in the semiconductor manufacturing industry. Conventionally, such carriers have been tracked through manufacturing operations by associating paper records with particular carriers and the batches of wafers or disks therein or by some semi-automated system such as manual keyboard entry.

Figure 4:
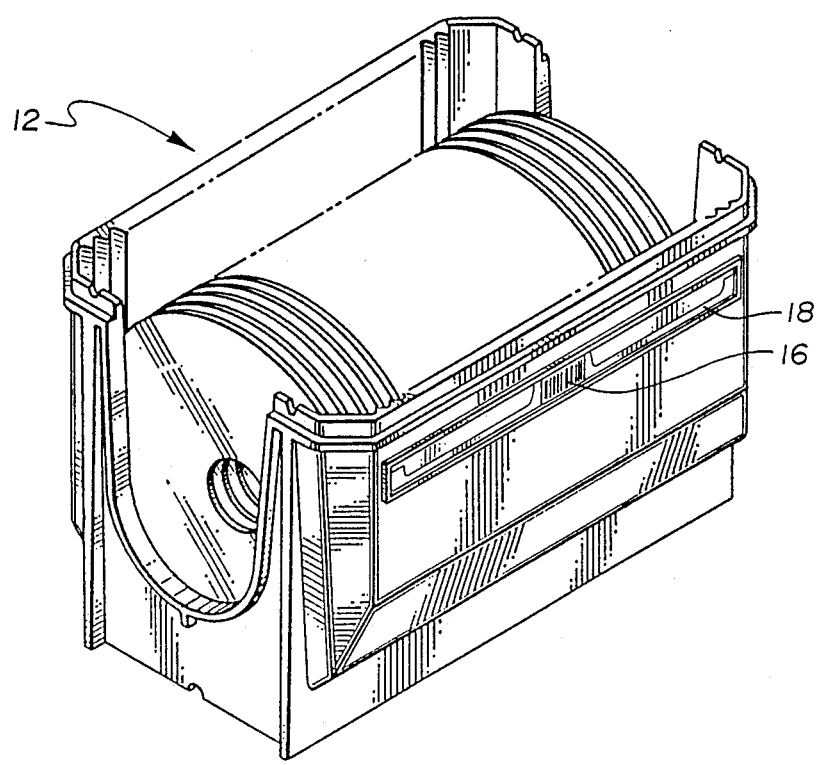
FIG. 4, is a pictorial of a typical carrier according to FIG. 1 with a coded bar code indicia tag encapsulated according to the present invention.

Molded carrier 12 is provided with a recessed area 14, which is sized to receive bar code tag 16 in one of the planar side walls thereof near the lip 15 at the top open disk-receiving end of the carrier. An optically transparent cover 18, sized to fit and close the recessed area after the bar code tag 16 has been set in place, is hermetically heat sealed to carrier 12. Preferably, the cover 18 is formed of the same material as the body of the carrier, which is generally a perfluorinated synthetic resin such as TEFLON. Encapsulation by hermetic heat sealing protects the bar code tag from attack by the various chemicals used in the processing of disks. Placing the bar code tag in this location, immediately below the projecting lip 15 at the top open disk-receiving end of the carrier permits the carrier 12 to be used without interference in the normal manner throughout the manufacturing and transporting processes. FIG. 4 illustrates a process carrier with an encapsulated bar code tag, according to the present invention, as shown in the embodiment of FIG. 1.

Alternatively, any method of encapsulation which protects the bar code tag from chemical attack while allowing it to remain visible to a bar code reader unit, may suitably be used. In addition, the bar code tag may alternatively be mounted on any flat surface on the wafer carrier without the costly tooling required to add a recess to accept the bar code tag. Locating the bar code on any flat surface of the wafer carrier permits the choice of location for the bar code which is most advantageous for a particular scanning set-up with minimal interference with other existing procedures and equipment in individual processing operations.

For example, as shown in FIG. 6, the bar code tag 54 may be attached by encapsulation on any flat surface of the carrier 50 without the need of providing a recess to receive the tag 54. The bar code cover 52 for attaching the tag 54 by encapsulation to the carrier's 50 flat surface, may be provided with biased retention tabs 56 for positioning the tag 54 in place during the heat-sealing operation. The bar code cover 52 may be made of the same material as bar code cover 18, which is generally the same material as is used for carrier 50 or 12. Carrier 50 is generally the same type as carrier 12.

Certain specific materials have been determined according to the present invention to be particularly suitable for the bar code tags. Bar code tag substrates of anodized aluminum, stainless steel, polymide synthetic resin such as KAPTON perfluorinated synthetic resins such as TEFLON, polyester synthetic resin and ceramic demonstrated acceptable limits of resistance to harsh chemical environments under representative use conditions. Testing of encapsulated bar code tags according to the present invention was carried out using the following typical semiconductor processing chemicals:

| Semiconductor Process Chemicals Used in Testing | | |
|---|---|---|
| Chemical | Formula | Ratio |
| Hydrofluoric Acid | $HF:H_2O$ | 1:1 |
| Dilute Hydrofluoric Acid | $H_2O:HF$ (50%) | 15:1 |
| Buffered Hydrofluoric Acid | $HF:NH_4F:H_2O$ | 49:40:11 |
| Nitric Acid | $HNO_3:H_2O$ | 7:3 |
| Aluminum Etch | $H_3PO_4:HNO_3COOH:H_2O$ | 85:5:5:5 |
| Aqua Regia | $HNO_3:HCl$ | 1:3 |
| Piranha | $H_2SO_4:H_2O_2$ | 5:1 |
| RCA Clean | $H_2O:NH_4OH:H_2O_2$ | 9:2:1 |
| Sodium Hydroxide | $NaOH:H_2O$ | 1:1 |
| Hydrochloric Acid | $HCl:H_2O$ | 37:63 |
| Water | $H_2O$ | |
| Hydrogen Peroxide | $H_2O_2:H_2O$ | 3:7 |

All ratios and percentages expressed are by volume. Bar code tags of KAPTON, available from Watson Lable Products, St. Louis, Mo. under the PC-100 series performed well in all these chemicals. Bar code tags of anodized aluminum, available from Metal Craft, Mason City, Iowa, performed well in all these chemicals, with the exception of those containing hydrofluoric acid, hydrochloric acid or nitric acid. Ceramic bar code tags available from Computype, Minneapolis, Minn., under the name COMPU-Ceramic and polyester tags overlaminated with a polyfluorocarbon film (TEDLAR), available from Watson Lable Products under the IDP-200 series also performed well.

Preferably, the bar code indicia is photographically applied to the bar code substrate to ensure accurate readability. Testing conditions have indicated that laser bar code scanners can accurately read the present bar code tags through an optically transparent cover of hermetically heat sealed TEFLON PFA of up to a thickness of approximately 0.090 inches.

The bar code tag 16 or 54 consists of a number of spaced apart parallel lines of varying widths. Usually dark lines on a light reflecting background are used but light reflective lines on a dark background also can be used. Data is coded in the width and spacing of the line so that when an optical probe is scanned across the code in a direction normal to the lines, a light beam in the probe is modulated in a manner which is unique to the particular bar code. The scanning can be affected either manually or automatically. The modulated light beam is directed to and detected by an electro-optical detector, such as a photodiode or phototransistor. From there the resulting signal is processed and stored in an electronic computer. The computer is programmed to provide inventorying, identifying and processing information associated with the carriers.

Generally, the electro-optical probe detectors, or bar code readers 23, which are used to scan the bar codes contain at least two essential components. These are an illuminator and an optical receiver. The illuminator is usually a non-collimated light source, such as an incandescent lamp or light emitting diode, or more recently a non-coherent collimated laser light source. The illuminator is coupled to a lens which directs the light beam to the surface of the bar code from which the light beam is reflected back and collected by the optical receiver. The optical receiver utilizes a second lens to focus the light beam on an electro-optical detector. The light source and the light detector may be located adjacent the respective lenses or they may be located remotely and connected to the lenses through electronic components or optical fibers. From the electro-optical detector, the resulting signal is processed and stored by an electronic computer 38.

For purposes of the present invention, bar code scanners based on laser or non-coherent light sources are considered preferable because they allow for rapid reliable non-contact scanning of the encapsulated bar code. Bar code readers employing a laser tube as a light source are commonly referred to as laser scanners and have a sufficient depth of field to read bar codes at a distance. Such laser scanners, which are commonly known in the art, generally operate by directing a laser beam at a rotating drum or multi-faced mirror or hologram to scan the beam across the bar code. The reflective scattered light is then incident on a photo cell which generates a corresponding voltage so that a voltage pattern with respect to the distance along the length of the bar code is developed. Because the rotational speed of the drum or mirrors or hologram is known, the reflectivity-length relationship can be converted to a voltage-time relationship, which is then used to decode the information contained in the encapsulated coded bar code. The utilization of laser bar code scanning technology in the present invention enables reading the bar codes at a distance from the disk carriers as they move past a stationary or hand held reader such as on a conveyor or in a continuous processing operation. As has been indicated, both stationary and hand held bar code readers or scanners based on laser light sources are presently available. See for example U.S. Pat. No. 4,560,862, U.S. Pat. No. 4,500,776, U.S. Pat. No. 4,460,120, U.S. Pat. No. 4,450,350, U.S. Pat. No. 4,431,912, U.S. Pat. No. 4,387,297, and U.S. Pat. No. 4,333,006. In addition, portable laser scanners are available to permit reading of coded bar code indicia passed underneath or along side of the scanning head. See for example U.S. Pat. No. 4,369,361. This allows the bar code symbols on the carrier walls to be oriented facing the operator during their passage past the scanner to facilitate sighting and registration of the bar code symbol with the laser light beam generated by the scanner head.

The computer to which the identifying bar code indicia is transmitted, may be connected as well to a variety of such desirable peripheral devices as a printer, a keyboard, a communications port, audiovisual enunciators, data display, and similar peripheral devices to constitute an intelligent data acquisition terminal for the information associated with the carriers and disks.

Figure 2:
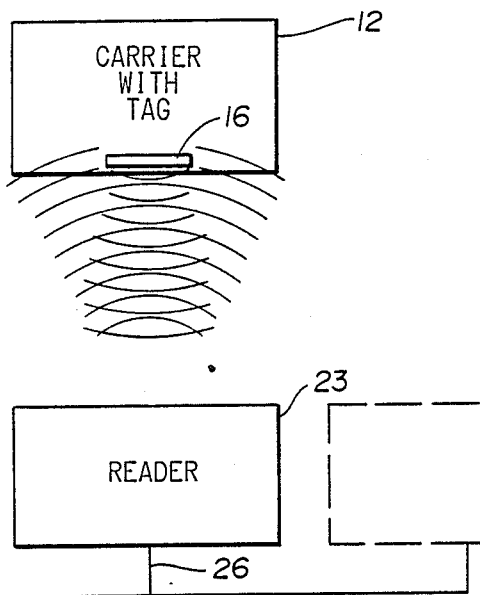
FIG. 2, is a block diagram of the bar code indicia monitoring system.

The system block diagram in FIG. 2 is provided to better illustrate the operation of the bar code tag in association with the various bar code readers or scanners. For this illustration, a single carrier 12 or 50 with attached bar code 16 or 54 is shown, but it will be readily understood that a plurality of identical or non-identical carriers will generally be used for transporting and storing numerous disk batches undergoing processing in a particular manufacturing facility or between facilities. A bar code reader or scanner 23 directs a light beam to the surface of the bar code tag 16 or 54. The identification of a bar code, and its associated carrier, by a scanner 23 can take place at distances from virtual contact up to several feet. The carrier 12 or 50 must be oriented so that the bar code 16 or 54 is optically visible to the scanner.

A plurality of bar code indicia readers 23 would normally be used in a manufacturing facility, each reader being stationed at a location adjacent to the place where a particular manufacturing operation takes place. The bar code reader outputs are all connected to a converter or digitizer 30 which converts signals from the reader or scanner 23. In the preferred embodiment shown, the bar code readers have output signals which are converted from analog to digital form in the digitizer 30 or the computer 38 and decoded into a digital number uniquely identifying each of the bar code tags 16 or 54 and its associated carrier and semiconductor wafer or memory disk batch. The unique identification number associated with a bar code tag 16 or 54 and the output signals from a particular bar code reader that detected it allows a master computer to determine at any point and time which of the carriers is at a location of interest within the processing facility.

Figure 3:
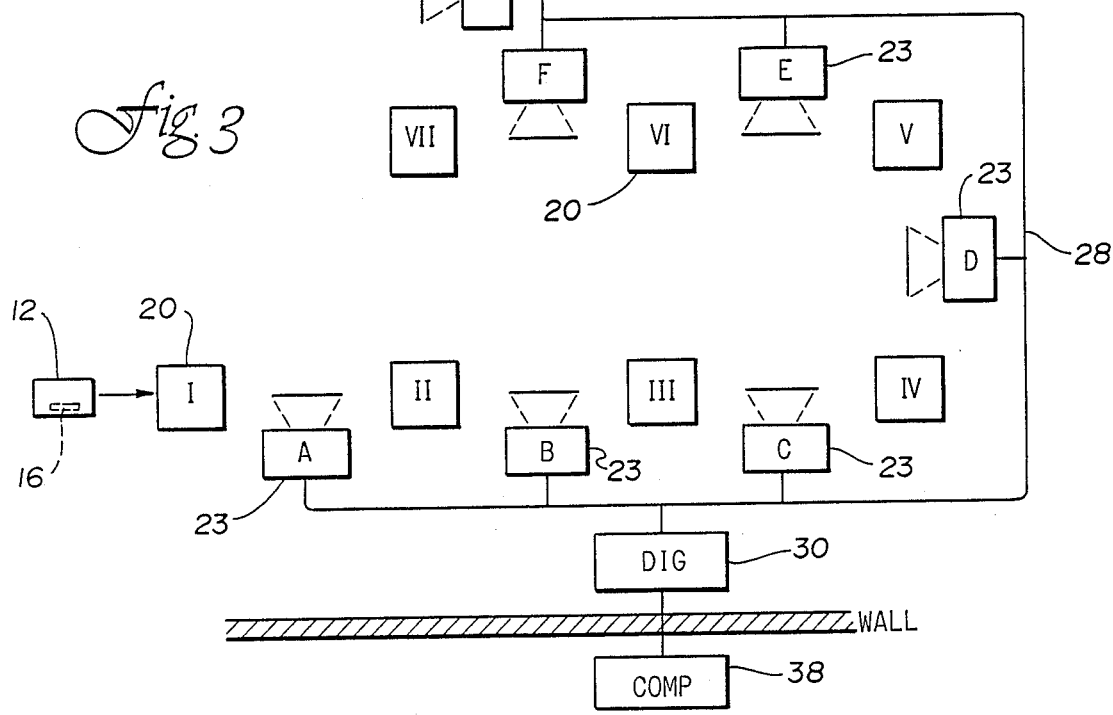
FIG. 3, is a schematic layout of a typical plant facility.

A typical facility application is illustrated in FIG. 3 where multiple remote bar code readers designated 23 are each stationed throughout the processing facility at appropriate locations designated as stations I through VIII. One or more bar code readers 23 may be positioned adjacent a particular station to monitor carriers as they are received or dispatched from the station or reach an intermediate location at the particular station. The outputs of the bar code readers 23A through H are connected to a transmission line 28 which links them via converter 30 with a computer 38 which can be positioned at any convenient location inside or outside of the facility. As carrier 12 or 50 bearing unique bar code tag 16 moves from station to station within the facility, the presence of the carrier at various stations can be verified and logged by computer 38 from individual readers 23A through 23H.

It will be realized by those skilled in the art that various modifications and additions to the method and system disclosed herein may be made without departing from the essential features of novelty of the invention which are intended to be defined and secured by the appended claims.

What is claimed is:

1. A method for monitoring the progress of a plurality of batches of disks through a multiplicity of operations at several locations comprising the steps of:
   inserting each batch of disks into a process carrier constructed and arranged for supporting the disks in a parallel, axially arranged spaced array;
   providing each carrier with an optically visible bar code tag encapsulated in the carrier and constructed, arranged and coded for uniquely identifying the carrier and batch inserted therein;
   detecting the presence of each carrier at one of the several locations by operating a multiplicity of limited range bar code reader units, each of which is positioned adjacent to one of the locations, the bar code reader units being constructed and arranged for determining the identification of any coded bar code indicia tag within its detection range; and
   monitoring the progress of at least one batch of disks through various locations by updating and storing location information received from the reader units.

2. The invention of claim 1 wherein each of the coded bar code indicia reader units directs a modulated light beam from a laser light source to a bar code tag within its detection range and wherein the bar code tag receives the light beam and returns to an optical receiver a reflected light beam uniquely characteristic of the bar code tag and of the carrier on which it is mounted.

3. The invention of claim 2 wherein the carrier is formed of perfluorinated synthetic resin and the bar code tag is formed of anodized aluminum, polymide synthetic resin, stainless steel, perfluorinated synthetic resin, ceramic or polyester synthetic resin and the bar code tag is attached to a surface of the carrier by hermetic heat sealing under an optically transparent cover of perfluorinated synthetic resin.

4. A system for tracking batches of disks through a plurality of operations comprising:
   a plurality of carriers, each of which is adapted for carrying a batch of at least one disk and each of which carrier has encapsulated on the outside surface of a vertical wall an optically visible bar code tag including a unique array of spaced apart parallel lines of varying widths containing data coded in the width and spacing of the lines uniquely identifying a single carrier;
   at least one remote recognition bar code reader constructed and arranged for directing a modulated light beam across the bar code in a direction normal to the lines and receiving back a reflective light beam uniquely characteristic of that bar code; and
   control means for receiving the output from the bar code readers and providing a control signal indicative of which carrier is within the range of which bar code reader.

5. The invention of claim 4 wherein each of the bar code reader units directs a modulated light beam from a laser light source to a bar code tag within its detection range and wherein the bar code tag receives the light beam and returns a reflected light beam uniquely characteristic of the bar code tag and the carrier upon which it is mounted.

6. The invention of claim 4, wherein the bar code tag is mounted on the carrier by:
   inserting the bar code tag in a recess in a surface of the carrier, the recess being constructed and arranged for supporting the bar code tag; and
   sealing the bar code tag in the recess with an optically transparent cover means constructed and arranged for covering and sealing the bar code tag.

7. The invention of claim 4, wherein the carrier is formed of perfluorinated synthetic resin and the bar code tag is formed of anodized aluminum, stainless steel, perfluorinated synthetic resin, ceramic, polyester synthetic resin, or polymide synthetic resin and the bar code tag is attached to a flat surface of the carrier by hermetic heat sealing under an optically transparent cover of perfluorinated synthetic resin.

8. A bar coded process carrier constructed and arranged for supporting a batch of at least one disk in a parallel, axially arranged spaced array and provided with an optically visible bar code tag encapsulated within the carrier, the bar code tag constructed, arranged and coded for uniquely identifying the carrier and batch inserted therein.

9. The bar coded process carrier according to claim 8, wherein the bar code tag is encapsulated within the carrier so as to protect the bar code tag from harsh chemical environments normally encountered in disk processing.

10. The bar coded process carrier according to claim 9, wherein the bar code tag substrate is anodized aluminum, stainless steel, perfluorinated synthetic resin, polymide synthetic resin, ceramic or polyester synthetic resin.

11. The bar coded process carrier according to claim 10, wherein the process carrier is formed of perfluorinated synthetic resin and the bar code tag is hermetically heat-sealed to the carrier under an optically transparent cover of perfluorinated synthetic resin.

* * * * *